United States Patent [19]
Pelzig

[11] 3,853,797
[45] Dec. 10, 1974

[54] POLYVINYL ACETATE /DEXTRIN/ C TO C POLYHYDRIC ALCOHOLS MATERIAL FOR NOVELTY ITEMS AND ARTS AND CRAFTS APPLICATIONS

[76] Inventor: Josef Pelzig, 6233 Bluebell Ave., North Hollywood, Calif.

[22] Filed: Mar. 26, 1973

[21] Appl. No.: 345,214

Related U.S. Application Data

[63] Continuation-in-part of Ser. No. 877,021, Nov. 14, 1969, abandoned, and a continuation-in-part of Ser. No. 194,693, Nov. 1, 1971, abandoned.

[52] U.S. Cl. .................. 260/17.4 ST, 260/17.4 SG
[51] Int. Cl............................................. C08d 9/06
[58] Field of Search ............... 260/17.4 ST, 17.4 SG

[56] References Cited
UNITED STATES PATENTS

| | | | |
|---|---|---|---|
| 2,444,396 | 6/1948 | Collins et al. | 260/17.4 ST |
| 2,536,470 | 1/1951 | Schoenholz | 260/17.4 ST |
| 2,808,381 | 10/1957 | Stone | 260/17.4 ST |
| 3,061,572 | 10/1962 | Packer | 260/31.4 |
| 3,219,613 | 11/1965 | Keene | 260/17.4 ST |

Primary Examiner—Melvin Goldstein
Assistant Examiner—Edward Woodberry
Attorney, Agent, or Firm—Spensley, Horn & Lubitz

[57] ABSTRACT

A composition comprising a dextrin incompatible polyvinyl acetate emulsion, glycerin and dextrin exhibiting excellent molding and/or coloring properties for such uses as a novelty item, a molding compound, an artist's tool, a transfer medium and an exercising device. The composition may upon prolonged exposure to air, dry to a semihard condition and, if desired, the material can be made soft again by immersing it in water and kneading the water into it. The composition may contain suitable coloring constituents to allow the color to be transferred from the composition to another surface it comes in contact with, such as paper or canvas. Also, indicia may be placed on the material by external means and such indicia transferred or printed to another surface.

32 Claims, No Drawings

POLYVINYL ACETATE /DEXTRIN/ C TO C POLYHYDRIC ALCOHOLS MATERIAL FOR NOVELTY ITEMS AND ARTS AND CRAFTS APPLICATIONS

This is a continuation-in-part application of my application Ser. No. 877,021 filed Nov. 14, 1969, now abandoned, and my copending application Ser. No. 194,693 filed Nov. 1, 1971, now abandoned.

BACKGROUND OF THE INVENTION

I. Field of the Invention

This invention relates generally to a solid plastic composition comprised primarily of a dextrin incompatible polyvinyl acetate emulsion, glycerin and dextrin which is very pliable, will dry in air to produce a semi-hard finish, can be produced to have varying degrees of pliability and can be softened by merely immersing the composition in water and kneading the water into it. Various coloring, antimicrobial and viscosity adjusting additives may added to the basic composition to achieve the desired properties.

II. Description of the Prior Art

Compounds for use as children's novelty items and for molding purposes are known in the art. However, the composition of the prior art materials are distinctly different from that of the invented composition. For example, U.S. Pat. No. 3,167,440 discloses a material which utilizes kerosene, a chlorine salt and grain flour. Also, another similar purpose material is disclosed in U.S. Pat. No. 3,384,498 which teaches a compound containing guar gum, an alkali metal borate and boric acid.

In contrast to these prior art materials the invented composition involves primarily an emulsion of dextrin incompatible polyvinyl acetate and a hydrolyzed dextrin in addition to other optional additives which will be discussed in detail below.

There are references to polyvinyl acetate emulsions but these polyvinyl acetate emulsions must be compatible with dextrin in order to form a fluid material which, when dried, will form a thin even coating with adhesive properties and which may be remoistened. U.S. Pat. No. 2,808,381 teaches a resin dextrin composition comprising a polyvinyl acetate emulsion, polyvinyl alcohol and dextrin exhibiting excellent adhesive qualities for use in sealing envelopes. This patent teaches that the polyvinyl acetate emulsion must be dextrin compatible because dextrin incompatible polyvinyl resins coagulate when mixed with dextrin thereby making a composition unusable as a remoistening adhesive for sealing envelopes.

The known prior art compounds do not exhibit many of the unique properties of the invented material. For example, none of the prior art materials have the ability to transfer the color in the material from the material to another media (e.g., paper) to provide a simple means of obtaining unusual effects, patterns and shapes on such other media. This latter property is particularly useful as an artist's tool or as a novelty play or art items for both children and adults. None of the other known materials are capable of satisfactorily transferring an image or other type of indicia created on the surface of the material from that material to another media, such as paper or canvas.

The invented material exhibits other unusual physical properties. The material can be easily stretched and if the ends of the stretched material are then rejoined and the material stretched again, the stretched portion becomes more free flowing. This stretching can be repeated innumerable times without shearing the material and obtaining a larger number of thinly stretched portion whose overall properties almost approach those of a liquid. When the invented material which is extremely elastic is finally stretched to its shearing point it breaks in an even or straight line manner at the point of separation and not in the stringy or uneven manner which is characteristic of the prior art materials. In fact the cross section of the sheared material appears as though a sharp cutting instrument had been used to achieve the separation.

None of the prior art materials are capable of satisfactorily transferring an image made with an external device such as water color marker pen, or the like to another surface (e.g. paper or canvas). The invented material is capable of being satisfactorily marked with a water color marker or with a brush containing water colors, to create an image thereon. The marking material can then be placed in contact with a suitable surface thereby completely transferring a corresponding image to such other surfaces. Also, since the invented material is very elastic and pliable the image created thereon can be stretched or distorted by manipulating the invented material to give highly unusual effects. With a single water color marking on the invented material, up to approximately 9 or 10 separate images can be transferred to the surface of another medium in either the same form or in the modified forms which are created by stretching the material.

Further, none of the known prior art compositions teach the unique combination and composition of ingredients contained in the invented composition and having the critical pH range required to obtain the desired characteristics.

BRIEF SUMMARY OF THE INVENTION

The present invention teaches a dextrin incompatible polyvinyl acetate emulsion, glycerin and dextrin to which may be added various other selected ingredients to obtain the desired pliability, coloring, image transferring characteristics, fragrance, and hardness. It has been found that a pH of about 6.0 to 8.0 is critical to obtaining the desired physical properties. Also, certain selected ingredients may be added to retard fungus and bacteria growth in the invented composition and thereby act as preservatives. The invented compound has been found to be completely nontoxic and perfectly safe for use by anyone, including children.

The various applications for which this material may find utility are virtually limitless. Some of the more apparent applications are as children' novelty item, an artist's tool for making pictures, sculptures and patterns, an image or indicia transfer medium (e.g., printing), a device for manipulation by persons requiring hand exercises, a molding compound and an arts and crafts material for children or adults. It should be understood that the enumerated uses and applications are merely for purposes of illustration and the invention is not intended to be limited thereto.

The invented composition may be made with varying degrees of pliability and with or without inherent color transferring characteristics. The material is capable of being marked with water color devices and if desired before drying the water color images can be transferred to other mediums such as paper, canvas, or the like.

The invented material is also capable of drying to a semihard or hard condition upon exposure to air and/or heat. This latter property may be particularly useful in arts and crafts applications. If desired, however, the semihard or hard material can be restored to its pliable or elastic condition by immersion in water and kneading until the desired physical properties are obtained. The ability to transfer the color of the material and/or a water color image makes the invented composition extremely useful for making pictures, patterns or master prints. When used in the latter manner, the material can also be stretched to give distorted or modified images of the original. The invented material is also useful for making models, toys, jewelry, etc. by letting the material dry to a semihard or hard consistency.

The specific components, proportions and methods for making the invented composition shall be described in detail hereinbelow.

DESCRIPTION OF THE PREFERRED EMBODIMENTS

The invented composition can be made by making a dextrin incompatible polyvinyl acetate emulsion containing glycerin and adding thereto a starch, such as granular dextrin. Also, the granular dextrin may be dissolved in water with glycerin and mixed with a suitable dextrin incompatible polyvinyl acetate emulsion. The details of these methods will be described in greater detail below. The polyvinyl acetate emulsion must be incompatible with dextrin because the emulsion must coagulate rather than dissolve to become a fluid material. A polyvinyl acetate emulsion, which is dextrin incompatible, typically contains protective colloids such as a polyvinyl alcohol which is sensitive to the addition of dextrin and which will cause coagulation of the polyvinyl acetate with the dextrin in solution. Furthermore, by using a dextrin incompatible polyvinyl acetate emulsion all the water of emulsification is incorporated in the material during the coagulation process. The dextrin incompatible material causes coagulation in the presence of dextrin to form a clay-like material and not a solution which can be dried to form a thin even coating with adhesive processes properties upon wetting the coating as taught by the prior art.

The preferred starch is dextrin $[(C_6H_{10}O_5)_x]$ or chemically altered dextrins. The dextrins may be hydrolyzed in various ways. Grenz-dextrin formed by the hydrolysis of starch by amylase has been found to yield excellent results. Generally, alkaline hydrolyzed dextrins are best, however, other starches, such as corn starch will also give acceptable results.

The dextrin incompatible polyvinyl acetate emulsion preferably should have about 35-55% solids content.

A small amount of glycerin, (e.g., in excess of 0.5%), is required in order to give the compound the desired smoothness and plastic qualities. In lieu of glycerin any of the polyhydric alcohols from $C_3$ through $C_8$ may be used to obtain the smoothness and plasticity desired. For example, propylene glycol has been used with satisfactory results.

In addition to the basic constituents mentioned above other ingredients may be added to enhance or modify the properties of the composition. For example, certain sugars, such as glucose or fructose or other aldohexoses, such as mannose and galactose; antimicrobial agents, such as the sodium salt of o-phenylphenol $[C_6H_4(C_6H_5)ONa.4H_2O]$; U.S. certified food, drug and cosmetic dyes (e.g., food coloring); non-toxic color pigments, almond extract, mint extract, or perfume; or inert fillers, such as talc, clay or kaolin.

The various additives mentioned enhance one or more of the properties of the basic composition. For example, the sugars, (e.g., glucose, etc.) give the composition an even smoother or shinier surface with less voids. This latter characteristic may be desirable in the printing applications since less surface color will be absorbed in the material. The sodium phenylphenol is a preservative which imparts better resistance to deterioration during manufacture and gives better storage and service life and imparts antifungal properties. The certified food dyes make possible the use of the invented material for transferring unique colored shapes and effects formed with the invented material onto another medium, usually paper. Dry color pigments can be added to give the material different nontransferable colors. The mint and almond extracts or a perfume may be added to give the final product a pleasant scent. Certain inert fillers like talc, clay or kaolin may be added to give the invented material a heavier consistency which may be desirable for making models and sculptures.

Various organic acids such as salicylic, adipic, citric, etc. may be added during the manufacture to control the pH characteristics of the compound within the desired range of about 6.0 to 8.0 if the pH is too high (alkaline). Certain alkaline additives such as triethanolamine, $[N(C_2H_2OH)_3]$, bicarbonate of soda $[NaHCo_3]$ or borax $[Na_2B_4O_7.10H_2O]$ may be used to control the pH within the desired range of 6.0 to 8.0 if the pH is too low (acidic). Triethanolamine is the preferred basic type additive. The finished material should have a pH of about 6.0 to 8.0 to yield the desired properties described herein. No skin irritation has been observed by the Applicant when using the invented composition. The optimum overall characteristics occur at a pH of about 6.8 to 7.2. It has been observed that a pH of 5.5 or lower give a product that has too loose a consistency and therefore is difficult to handle effectively. A pH in excess of 8 yields a product which is not as pliable or flexible as is normally desired to achieve the desired molding, handling and printing characteristics.

Addition of certain series of esters, such as from dibutyl phthalate all the way to iso-octyl phthalate may also be useful in the invented composition as plasticizers to change the flexibility or pliability of the material.

It should be understood that while certain preferred additives have been specifically mentioned to obtain the properties and characteristics mentioned above, other suitable constituents of an equivalent nature will be apparent to those skilled in the art and are considered within the teachings of this invention.

The following are some examples of the final composition of the invented material. The amounts recited herein are all in weight percentages. Wherever additives are suggested it should be understood that such are added to the basic composition and the precentages of the ingredients already present are then reduced on a percentage basis in the total composition.

EXAMPLE I

| | |
|---|---|
| Dextrin incompatible polyvinyl acetate emulsion being composed of 35 to 55% solids and 65 to 45% water | About 90 to 93.5% |

EXAMPLE I -Continued

| | |
|---|---|
| Dextrin | About 3 to 8% |
| Glycerin | About 0.5 to 2% |

To alter or improve various characteristics certain additives can be used. If desired about 0.75 to 4% glucose (or other similar aldohexose) may be added to give the composition a smoother consistency with less surface voids.

Also, about 5 to 15% of an inert filler, such as talc, clay or kaolin may be added to give the material a heavier consistency which may be desirable when using the invented material to form models or sculptures.

Another addition which may be added to the basic material of Example I as a plasticizer is about 0.5 to 15% of an ester selected from the group of phthalates in the series from di-butyl to iso-octyl phthalates. To give the material a pleasant frangrance about 0.05 to 0.5% of a mint or almond extract may be added or else a commercial perfume.

The material of Example I itself exhibits excellent molding and pliability properties. To improve the storage and service life of the composition about 0.01 to 0.5% of an antimicrobial or preservative agent (e.g., sodium salt of phenylphenol) may be added. The material described above also exhibits the ability to be marked with a water color, thereby making an image or other indicia. The image or indicia may be transferred, if desired, by placing the invented material surface containing the image or indicia on a suitable surface (e.g., paper, canvas, etc.) and by applying slight pressure on the material with the hand or other suitable means.

EXAMPLE II

The composition of Example I can be modified to provide a material with colors other than that obtained from the normal reciting of the ingredients of the constituents and additives described above. To accomplish this, it has been found that excellent results are obtained utilizing 1 to 15% of a dry, fine grind, non-toxic solid pigment of the desired color. One such group of pigments is manufactured by Permanent Pigments of Cincinnati, Ohio under the name "Dry Color." Exemplary of the pigments employed in the present invention under the name "Dry Color" are the Cadmium Yellow Medium which contains pure cadmium sulfide co-precipitated with barium sulfate, Cerulean Blue which contains genuine cobalt-tin oxide pigment, Prussian Blue which contains ferric ferro-cyanide, Viridian which contains pure hydrated chromium oxide (verte emeraude), Phthalocyanine Green "Monstral" Green which contains pure chlorinated copper phthalocyanine.

If desired, 1 to 15% of a fluorescent color can be added in lieu of the dry pigment mentioned above. This is useful for obtaining unusual effects with the invented material under Ultraviolet light. Certain fluorescent colors are manufactured by Shannon Luminous Materials Co. of Los Angeles, Cal., e.g., No. 41 Lemon Yellow, No. 21 Spectrum Blue, No. 71 Cerise, etc.

The colors discussed in this Example are non-transferable, i.e., they are intended to color the material but not transfer such color to another medium (e.g., paper, canvas, etc.) when the material is placed in contact with such other medium.

The pigments used may be either organic or inorganic. The colored material provides an attractive appearance for molding, arts and crafts and novelty item applications.

The material of Example II exhibits the same basic characteristics of the material discussed in Example I. For example, water color images or other external indicia applied to the surface of the colored material of Example II can be transferred to another medium without transferring the background color of the material.

If desired the various additives discussed in Example I (e.g., antimicrobial agent, sugar, inert filler, perfume, plasticizer, etc.) can be added to the material of Example II to modify or enhance the basic properties and characteristics.

EXAMPLE III

The basic composition of Example I can be expressly modified to provide a material with transferable colors. Thus, in addition to the excellent molding and image transferring properties discussed for the materials of Examples I and II, the material of Example III allows the background color of the material to be transferred to another surface or medium. To achieve this result 0.05 to 5% by weight of non-toxic FDA (Food and Drug Administration) certified organic coal tar dyes (e.g., food coloring) can be used depending on the darkness of the color desired. Actually amounts in excess of 5% can also be used. However, in order to make an economical product and in order to avoid changing the consistency of the product drastically, it has been found that about 0.05 to 5% is a desirable range depending on the dye used. Excellent results have been obtained using up to about 5% of FDC Blue No. 1, Red No. 2, and Violet No. 1. However, no more than about 2% of FDC Yellow No. 5 or Red No. 3 is suggested since the material becomes too fluid and requires the pH to be raised significantly. For the most part these colors are water soluble and can be removed from the hands of the user by merely washing with soap and water.

For purposes of completeness it should also be mentioned that each of the FDC certified coloring agents mentioned hereinabove is well known. The following table sets forth data relating the official FDA name with both the classification and chemical nomenclature associated therewith:

TABLE

| Official FDA Name | Classification | Chemical Name |
|---|---|---|
| FD&C Blue No. 1 | Triphenylmethane | Disodium salt of 4-{[4-(N-ethyl-p-sulfobenzylamino)phenyl](2-sulfoniumphenyl)methylene}[1-N-ethyl-N-p-sulfobenzyl)-$\Delta^{2,5}$-cyclohexadienimine] |
| FD&C Red. No. 2 | Monoazo | Trisodium salt of 1-(4-sulfo-1-naphthylazo)-2-naphthol-3,6-disulfonic acid |
| FD&C Red. No. 3 | Xanthene | Disodium salt of 9-o-carboxy-phenyl-6-hydroxy-2,4,5,7-tetra-iodo-3-isoxanthrone |
| FD&C Violet No. 1 | Triphenylmethane | Monosodium salt of {4- [4-(N- |

TABLE-Continued

| Official FDA Name | Classification | Chemical Name |
| --- | --- | --- |
| | | ethyl-*p*-sulfobenzylamino)phenyl]-[4-(N-ethyl-*p*-sulfoniumbenzylamino)phenyl]methylene}-(N,N-dimethyl-$\Delta^{2,5}$-cyclohexadienimine) |
| FD&C Yellow No. 5 | Pyrazolone | Trisodium salt of 3-carboxy-5-hydroxy-1-*p*-sulfophenyl-4-*p*-sulfophenylazopyrazole |

The material of Example III has excellent utility as an artist's tool since many unusual designs, patterns and effects can be created by allowing the invented material to come in contact with a suitable surface such as paper, canvas or other fabrics. The color leaves the material to transfer the unusual shapes, etc. created by the material to the other surface. By stretching the material repeatedly it takes on a free flowing property similar to a liquid. By allowing the material to "flow" onto a paper surface, for example, highly unusual effects and shapes are created which are transferred onto the paper since the color leaves the invented material. These effects give the appearance of brushed water colors. By using various colors of the invented materials of this Example unusual artistic compositions may be created. Also, different colored materials may be placed on a colored or neutral background slab of the invented material and then transferred to another surface in the same manner previously described for transferring water color images. The material of this Example may also be marked with water color paints or markers and the images and indicia created then transferred along with the background color of the material to create further unusual and creative pictures, designs, patterns, and effects on another suitable surface. The color transferred by the material dries in a matter of a few minutes.

It should be understood that in addition to the specific methods of using the colored material described hereinabove, many other similar applications will become apparent to the user. Many creative patterns and designs may be formed by combining the various individual modes of use previously described. Since the material is elastic various effects can be achieved by stretching and/or distortion techniques. For example, images made with water color paints, or the like, may be stretched to obtain modified forms of the same image.

The various additives in the percentages described in Example I may be added to the material of Example III in order to enhance or modify the properties thereof, if desired.

While glycerin is preferred and has been specifically mentioned in Examples I–III above and Methods A and B below, it should be understood that polyhydric alcohols from $C_3$ to $C_8$ such as propylene glycol may be substituted in the same percentage for the glycerin with acceptable results.

The invented material is easy to make since it requires no elaborate or expensive equipment. The invented material has been made satisfactorily from the two preferred methods described below.

METHOD A

About 70% by weight of a dextrin incompatible polyvinyl acetate emulsion of about 35–55% solids (preferably about 50%) is mixed with about 1.8% glycerin by weight. Borden's Polyco–547, and Monsanto's GELVA Polyvinyl Acetate S–55H, S–55L and S–55R (molecular weight 30,000 to 60,000 mostly crosslinked [average number]) are typical polyvinyl acetate emulsions used in the preferred embodiment of the invention. About 7% by weight of solid granular dextrin is added to the above mixture and agitated by a suitable mixing device (e.g., dough mixer) to blend the dextrin into the mixture thereby forming the invented material. In small batches the dextrin can be kneaded into the emulsion without using a mixing device. A dextrin, No. 20–5531, manufactured by National Starch Chemical Corporation is used in the preferred embodiment of the invention.

Ideally, the pH should be controlled to about 7.0 (±0.2) although acceptable results can be obtained with a pH as low as about 6 or as high as about 8.

As discussed previously, alkaline hydrolyzed dextrins give the best results. Depending on the type of dextrin used, the pH may have to be adjusted within the range of 6 to 8 by adding suitable amounts of organic acids (e.g., salicylic, citric or adipic) or basic materials (e.g., triethanolamine, bicarbonate of soda or borax).

It has been found that to obtain the best results, the ratio of dextrin incompatible polyvinyl acetate emulsion to dextrin as solids should be kept at about 5:1 by volume.

Also, it is desirable for best results that the amount of glycerin in the final product be maintained between about 0.8 to 1.2% by weight. When the glycerin content approaches 0.5% the material becomes grainy (not as smooth) and not as plastic. As the glycerin content approaches 2.0% the material may become too fluid for the applications described above. When the glycerin or polyhydric alcohol (e.g., propylene glycol) is in the range of 0.8 to 1.2 the final water content is about 45.8 to 61.2% by weight.

The amount of dextrin can be varied slightly if desired to obtain the desired composition within the ranges previously discussed. Also, the various additives discussed in Example I above may be added after adding the dextrin to obtain the desired characteristics or, properties previously mentioned in detail. It may be necessary, however, after using an additive to control the pH with a suitable acid or base to keep the final product within the pH range of 6 to 8.

METHOD B

About 7% by weight of dextrin is dissolved in about 22% by weight water containing 1% by weight glycerin. The pH of this solution should be controlled to about 7.0. The dextrin-glycerin solution is then added to 70% by weight dextrin incompatible polyvinyl acetate emulsion having about 35–55% solids (preferably about 50%). The final pH is then adjusted if necessary to be within the range of 6 to 8 and preferably between 6.8 to 7.2% to obtain optimum overall properties.

As discussed in Method A above, the ratio of polyvinyl acetate solids to dextrin as solids should be kept at about 5:1 and the pH properly controlled. Also, the process should insure a glycerin content in the final product between about 0.8 to 1.2% for best results.

Further, as discussed in Method A, various additives may be added as desired while maintaining the pH within the range of 6 to 8 in the manner previously recited.

It has been found that Method A is particularly useful for obtaining a molding type material since apparently less water is entrapped in the material than when the material is made by Method B. On the other hand, Method B is particularly desirable when making a printing type material since more water is entrapped. However, if desired, the entrapped water of Method B can be evaporated, if desired, to obtain the same properties as the material formed by Method A. However, both methods allow the formation of products having the same general overall properties and the differences are merely of degree. The compositions discussed in Examples I–III above can be made by either method.

It should be understood that while certain preferred applications, methods, and additives have been disclosed, the invention is not so limited, since other applications, methods and additives within the scope of the present invention will be apparent to those skilled in the art.

I claim:
1. A solid plastic composition which is highly elastic and pliable having a pH of about 6 to 8 consisting essentially of:
  a. about 3 to 8% dextrin;
  b. about 90 to 93.5% dextrin incompatible polyvinyl acetate emulsion being composed of 35 to 55% solids and 65 to 45% water; and
  c. about 0.5 to 2% of an alcohol selected from the group consisting of polyhydric alcohols in the series $C_3$ to $C_8$.

2. The composition of claim 1 in which 0.8 to 1.2% of said alcohol is present.

3. The composition of claim 1 containing about 0.01 to 0.5% of an antimicrobial agent.

4. The composition of claim 1 containing about 0.05 to 5% of a non-toxic Food and Drug Administration certified dye.

5. The composition of claim 1 containing about 1 to 15% of a dry non-toxic solid pigment.

6. The composition of claim 1 containing about 5 to 15% of an inert filler material.

7. The composition of claim 1 containing about 0.5 to 15% of an ester selected from the group consisting of the phthalates in the series of di-butyl to iso-octyl phthalate.

8. The composition of claim 1 containing 0.75 to 4% of an aldohexose selected from the group consisting of glucose, fructose, mannose and galactose.

9. The composition of claim 1 in which the pH is controlled within the range of 6 to 8 by the addition of an organic acid.

10. The composition of claim 1 in which the pH is controlled within the range of 6 to 8 by the addition of an alkaline material.

11. The composition of claim 1 in which said polyhydric alcohol is propylene glycol.

12. The composition of claim 3 in which said antimicrobial agent is a sodium salt of o-phenylphenol.

13. The composition of claim 6 in which said inert filler is selected from the group consisting of talc, kaolin and clay.

14. The composition of claim 9 in which said organic acid is selected from the group consisting of adipic, citric and salicylic.

15. The composition of claim 10 in which said alkaline material is triethanolamine.

16. A solid plastic composition which is highly elastic and pliable having a pH of about 6 to 8 consisting essentially of:
  a. about 3 to 8% dextrin;
  b. about 90 to 93.5% dextrin incompatible polyvinyl acetate emulsion composed of 35 to 55% solids and 65 to 45% water; and
  c. about 0.5 to 2% of an alcohol selected from the group consisting of glycerin and propylene glycol.

17. The composition of claim 16 in which 0.8 to 1.2% of said alcohol is present.

18. The composition of claim 16 containing about 0.01 to 0.5% of an antimicrobial agent.

19. The composition of claim 16 containing about 0.05 to 5% of a non-toxic Food and Drug Administration certified dye.

20. The composition of claim 16 containing about 1 to 15% of a dry non-toxic solid pigment.

21. The composition of claim 16 containing about 5 to 15% of an inert filler material.

22. The composition of claim 16 containing about 0.5 to 15% of an ester selected from the group consisting of the phthalates in the series of di-butyl to iso-octyl phthalate.

23. The composition of claim 16 containing 0.75 to 4% of an aldohexose selected from the group consisting of glucose, fructose, mannose and galactose.

24. The composition of claim 16 in which the pH is controlled within the range of 6 to 8 by the addition of an organic acid.

25. The composition of claim 16 in which the pH is controlled within the range of 6 to 8 by the addition of an alkaline material.

26. The composition of claim 18 in which said antimicrobial agent is a sodium salt of o-phenylphenol.

27. A solid plastic composition which is highly elastic and pliable having a pH of 6.8 to 7.2 consisting essentially of:
  a. about 3 to 8% dextrin;
  b. about 90 to 93.5% of dextrin-incompatible polyvinyl acetate emulsion composed of 35 to 55% solids and 65 to 45% water; and
  c. 0.8 to 1.2% of an alcohol selected from the group consisting polyhydric alcohols from $C_3$ to $C_8$.

28. The composition of claim 27 in which said polyhydric alcohol is selected from the group consisting of glycerin and propylene glycol.

29. The composition of claim 27 containing about 0.01 to 0.5% of an antimicrobial agent.

30. The composition of claim 27 containing about 0.05 to 5% of a non-toxic Food and Drug Administration certified dye.

31. The composition of claim 27 containing about 1 to 15% of a dry non-toxic solid pigment.

32. The composition of claim 29 in which said antimicrobial agent is a sodium salt of o-phenylphenol.

* * * * *